United States Patent [19]
Fujita et al.

[11] Patent Number: 5,888,380
[45] Date of Patent: Mar. 30, 1999

[54] HYDROPROCESSING CATALYST AND USE THEREOF

[75] Inventors: Katsuhisa Fujita, Niihama; Tetsuro Kamo, Ooji-machi; Masafumi Shimowake, Kitashin-machi; Yoshimasa Inoue, Matsudo, all of Japan

[73] Assignee: Nippon Ketjen Co., Ltd., Tokyo, Japan

[21] Appl. No.: 530,037

[22] Filed: Sep. 19, 1995

[51] Int. Cl.$^6$ .................................................. C10G 17/00
[52] U.S. Cl. .............................. 208/251 H; 208/216 R; 208/216 PP; 502/315; 502/305; 502/314
[58] Field of Search .................... 208/216 PP, 251 H; 502/305, 314, 315

[56] References Cited

U.S. PATENT DOCUMENTS

| | | | |
|---|---|---|---|
| 3,931,052 | 1/1976 | Oleck et al. | 252/465 |
| 4,588,709 | 5/1986 | Morales et al. | 502/314 |
| 5,223,472 | 6/1993 | Simpson et al. | 502/314 |

Primary Examiner—Helane Myers
Attorney, Agent, or Firm—Oliff & Berridge, PLC

[57] ABSTRACT

A catalyst composition suitable for effecting simultaneous hydrodesulphurisation and hydrodemetallisation of sulphur and metals containing feedstocks which shows a high hydrodesulphurisation activity, a high hydrodemetallisation activity, and a long life is disclosed.

The catalyst includes: a) a support, at least 90 wt. % of which includes alumina, which alumina has an R value of from 0.08 to 0.30, the R value being defined as the ratio between the integrated intensity of the X-ray diffraction peak at $2\theta=32°$ and the integrated intensity of the X-ray diffraction peak at $2\theta=46°$, b) from 2 to 8 wt. % of a Group VIB metal component, calculated as metal, c) from 0.5 to 2.5 wt. % of a Group VIII metal component, calculated as metal; and d) a pore size distribution as determined by nitrogen adsorption satisfying the following requirements: (i) a pore volume of from 0.5 to 1.0 ml/g, (ii) an average pore diameter of from 18 to 30 nm, and (iii) of the pore volume of pores with a diameter below 60 nm at least 40% is present in pores within a range of the average pore diameter ±5 nm.

A process for use of this catalyst and for its preparation is also disclosed.

6 Claims, No Drawings

HYDROPROCESSING CATALYST AND USE THEREOF

CROSS REFERENCE TO RELATED APPLICATIONS

This application claims the benefit of the filing date of prior Japanese Patent Application No. DOJ 4797, filed Sep. 19, 1994, which is incorporated herein by reference in its entirety.

BACKGROUND OF THE INVENTION

1. Field of the Invention

The present invention relates to a hydroprocessing catalyst, more particularly, to a catalyst suitable for effecting simultaneous hydrodesulphurisation and hydrodemetallisation of sulphur- and metals-containing feedstocks. The invention further relates to a process for the use of this catalyst, and to a process for the preparation thereof.

2. Description of the Related Art

One of the steps in the preparation of ready-for-use products from heavy oil fractions is the complete or partial removal of impurities. Heavy feedstocks, such as feeds based on atmospheric residual oils, vacuum residual oils, tar sand oils, and shale oils generally contain sulphur components and metallic components. These impurities can be removed by contacting the feedstock with a hydroprocessing catalyst at elevated temperature and pressure in the presence of hydrogen. This will cause the sulphur compound to be converted to $H_2S$, while the metals precipitate on the catalyst particles.

The catalysts which are to effect this combined hydrodesulphurisation and hydrodemetallisation have to satisfy quite stringent requirements. On the one hand, the hydrodesulphurisation and hydrodemetallisation activity of the catalyst should be high, while on the other, the catalyst should have a long life. It has proven difficult to find a catalyst which satisfies all three demands simultaneously. This is so because these demands are inconsistent among themselves. For example, if one improves the hydrodesulphurisation activity by increasing the metals content of the catalyst, it turns out that this measure is accompanied by a shorter catalyst life.

Alternatively, if one increases the average pore diameter of the catalyst to increase its hydrodemetallisation activity, the resulting lower surface area will lead to decreased hydrodesulphurisation activity.

In the literature, several hydroprocessing catalysts have been proposed to effect simultaneous hydrodesulphurisation and hydrodemetallisation of hydrocarbon feeds, all of which have tried to find the optimum combination of hydrodesulphurisation activity, hydrodemetallisation activity, and catalyst life.

U.S. Pat. No. 4,588,709 has tried to solve this problem by preparing the catalyst by way of a specific double impregnation procedure.

U.S. Pat. No. 3,931,052 describes a catalyst for simultaneous hydrodesulphurisation and hydrodemetallisation with a relatively low surface area, the support of which preferably consists of delta- and/or theta-alumina.

U.S. Pat. No. 5,223,472 describes a catalyst for the simultaneous hydrodesulphurisation and hydrodemetallisation of hydrocarbon feeds, the support of which comprises at least 10 wt. % of delta-alumina and the balance gamma-alumina. However, it appears that none of these catalysts satisfies all the requirements of high hydrodesulphurisation activity, high hydrodemetallisation activity, and a long life. Hence, there is still need for a catalyst composition which combines high hydrodesulphurisation activity with high hydrodemetallisation activity and a long life.

SUMMARY OF THE INVENTION

In accordance with one aspect of the present invention, there is provided a catalyst composition including:
a) a support, at least 90 wt. % of which includes alumina, which alumina has an R value of from 0.08 to 0.30, the R value being defined as the ratio between the integrated intensity of the X-ray diffraction peak at $2\theta=32°$ and the integrated intensity of the X-ray diffraction peak at $2\theta=46°$;
b) from 2 to 8 wt. % of a Group VIB metal component, calculated as metal;
c) from 0.5 to 2.5 wt. % of a Group VIII metal component, calculated as metal; and
d) a pore size distribution as determined by nitrogen adsorption satisfying the following requirements:
(i) a total pore volume of from 0.5 to 1.0 ml/g,
(ii) an average pore diameter of from 18 to 30 nm, and
(iii) of the pore volume of pores with a diameter below 60 nm at least 40% is present in pores within a range of the average pore diameter ±5 nm.

In accordance with another aspect of the present invention, the catalyst composition satisfies the additional requirement (iv) that from 10 to 20% of the pore volume of pores with a diameter below 50 nm is present in pores with a diameter of from 35 to 50 nm.

In accordance with a further aspect of the present invention, there is provided a process for the simultaneous hydrodesulphurisation and hydrodemetallisation of a feedstock containing metals and sulphur, wherein the feedstock is contacted at elevated temperature and pressure with a catalyst composition according to the present invention.

These and other aspects of the present invention will become apparent upon a review of the following detailed description and the claims appended thereto.

DETAILED DESCRIPTION OF PREFERRED EMBODIMENTS

The present invention provides a catalyst composition satisfying the above needs. The catalyst composition according to the invention is characterized in that it includes:
a) a support at least 90 wt. % of which includes alumina, which alumina has an R value of 0.08 to 0.30, the R value being defined as the ratio between the integrated intensity of the X-ray diffraction peak at $2\theta=32°$ and the integrated intensity of the X-ray diffraction peak at $2\theta=46°$,
b) 2 to 8 wt. % of Group VIB metal component, calculated as metal,
c) 0.5 to 2.5 wt. % of Group VIII metal component, calculated as metal; and
d) a pore size distribution as determined by nitrogen adsorption satisfying the following requirements:
(i) the total pore volume is 0.5 to 1.0 ml/g,
(ii) the average pore diameter is 18 to 30 nm,
(iii) of the pore volume of pores with a diameter below 60 nm at least 40% is present in pores within a range of the average pore diameter ±5 nm.

As will be elucidated below, it is important that the catalyst according to the invention satisfy all above-mentioned requirements a to d. If any one of these requirements is not met, the advantageous effect of the catalyst according to the invention, that is, a combination of high hydrodesulphurisation activity, high hydrodemetallisation activity, and a long life, is not obtained.

The alumina R value is an indication of the crystal structure of the alumina present in the catalyst according to the invention.

The alumina commonly used in the hydroprocessing catalysts of the prior art is gamma-alumina. This product can be obtained by calcination of an alumina hydrate, generally boehmite, at a temperature over 500° C. At a temperature above 800° C. conversion of the gamma-alumina into delta-alumina will start to take place. At even higher calcination temperatures theta-alumina will be formed, and when the calcination temperature reaches 1100° C., alpha-alumina is formed.

During the conversion of gamma-alumina into alpha-alumina, via delta- and theta-alumina, the alumina's surface area is reduced, and the surface hydration is changed. This is reflected in a change in catalytic properties. Where gamma-alumina is highly active and makes a high distribution of the metal components possible, alpha-alumina is substantially inert, and the incorporation of metal components into this material is difficult. Needless to say, there is no instantaneous conversion when the product is heated to the required conversion temperature, and mixtures of various products can be obtained by carefully selecting calcination times and temperatures.

In the present invention, at least 90 wt. % of the catalyst support includes an alumina having a mixture of gamma-alumina and delta- and/or theta-alumina in which the various components are present in a certain ratio. This composition is reflected in the alumina R value, which is in the range of from 0.08 to 0.30. The R value can be expressed in by the formula $$R = \frac{[I(2\theta) = 32°]}{[I(2\theta) = 46°]}$$

in which $[I(2\theta)=32°]$ and $[I(2\theta)=46°]$ stand for the integrated intensity of the peak at a $2\theta$ angle of the X-ray diffraction spectrum at 32° and 46°, respectively. In the present specification, use is made of an X-RAY DIFFRACTOMETER RINT-1100V, available from Rigaku International Co. The following measurement conditions and apparatus were used: CuK alpha-ray vessel, vessel voltage 50 kV, vessel current 40 mA, double axis vertical goniometer, scanning rate 2.000°/min, emitting slit width 1°, scattering slit width, 1°, receiving slit width 0.3 mm, $2\theta$ angle $5° \leq 2 \leq 80°$.

The peak which appears at $2\theta=46°$ is due to gamma-alumina, while the peak appearing at $2\theta=32°$ C. is due to delta- and/or theta-alumina. At this angle the latter two alumina types cannot be distinguished from each other by way of X-ray diffraction. The two peaks at $2\theta=46°$ and $2\theta=32°$ do not overlap and can therefore be readily integrated to calculate the integrated intensity. In calculating the integrated intensity, the background intensity is not taken into account, as is well known to the person skilled in the art.

In this respect it is noted that the R value should be determined on the blank support, on which no metals are present.

As stated before, the R value of the alumina present in the catalyst according to the invention is in the range of from 0.08 to 0.30. The lower the R value, the more gamma-alumina is present in the catalyst; the higher the R value, the more delta- and/or theta-alumina is present. If the R value is below 0.08, the percentage of gamma-alumina in the support becomes too high, which will lead to a catalyst with a highly active surface and a good metals distribution on the one hand, but on the other hand, and more importantly, this high activity will cause a significant amount of the hydrodemetallisation reaction to take place on the outside of the catalyst surface, which will result in blocking of the catalyst pores by the contaminant metals precipitating on the catalyst surface as a result of the hydrodemetallisation reaction. This will result in a decreased catalyst life.

Conversely, if the R value is above 0.30, the percentage of delta- and/or theta-alumina present in the support material becomes too high, and this will result in a catalyst in which the metal components are poorly distributed over the catalyst surface, which will lead to low hydrodesulphurisation and low hydrodemetallisation activity. Preferably, the R value is between 0.20 and 0.25.

In this respect it is noted that none of the documents cited above describes a catalyst including alumina with an R value within the specified range.

The alumina present in the catalyst of U.S. Pat. No. 4,588,709 is never treated at above 600° C., which temperature is not high enough to induce the formation of delta- and/or theta-alumina. Thus, the alumina R value in this patent is below the lower limit of the range of the present invention.

On the other hand, it appears from the very high calcination temperatures disclosed in U.S. Pat. No. 3,931,052 that the alumina present in the catalyst of this patent will contain a substantial amount of delta-alumina, theta-alumina or a mixture thereof. This leads to a catalyst with an R value above the upper limit of the range specified for the catalyst according to the present invention.

U.S. Pat. No. 5,223,472 describes a catalyst of which it is stated that it includes at least 10 wt. % of delta-alumina, as determined by X-ray diffraction, and the balance gamma-alumina. It is unclear how these values are determined, because a delta-alumina standard is not available. In any case, as can be seen from the calcination temperatures employed in this reference, the percentage of delta-alumina of this reference will result in an R value of more than 0.30.

The catalyst according to the invention includes a Group VIB metal component and a Group VIII metal component. The Group VIB metal component is preferably selected from molybdenum and tungsten, and most preferably is molybdenum. The Group VIII metal component is preferably selected from cobalt and nickel, and most preferably is nickel. The Group VIB metal component is present in an amount of from 2 to 8 wt. %, calculated as metal on the weight of the catalyst. If the Group VIB metal content is below 2 wt. %, the catalytic activity of the catalyst, more particularly its hydrodesulphurisation activity, is insufficient. A Group VIB metal content above 8 wt. % causes the hydrodemetallisation reaction to take place at the entrance of the catalyst pores, which may lead to pore plugging. The Group VIB metal preferably is present in an amount of from 6 to 8 wt. %. The Group VIII metal component is present in an amount of from 0.5 to 2 wt. %, calculated as metal on the weight of the catalyst. If the Group VIII metal content is below 0.5 wt. %, the hydrodesulphurisation activity of the catalyst becomes too low. If the Group VIII metal content is above 2 wt. %, pore plugging by coke formation will be increased. The Group VIII metal component preferably is present in an amount of from 1.2 to 1.8 wt. % The catalyst according to the invention may contain additional compounds if so desired.

For example, the catalyst support material may contain up to 10 wt. % of other compounds, such as silica, titania, zirconia, and the like. Preferably, the support material contains less than 5 wt. % of these additional components, more preferably less than 2 wt. %. It is most preferred for the support material to consist substantially of alumina.

If desired, it is possible to incorporate additional catalytic components into the catalyst composition. For example, it is possible to incorporate phosphorus into the catalyst composition to improve its hydrodenitrogenation activity. If phosphorus is added, it is generally present in an amount up to 10 wt. %, based upon the weight of the catalyst, calculated as $P_2O_5$.

The pore size distribution of the catalyst strongly influences the hydrodemetallisation activity of the catalyst. The pore size distribution of the catalyst should be such that a sufficiently fast diffusion of the metal-containing asphaltene molecules in the catalyst pores is obtained. Therefore, the pore size distribution of the catalyst according to the invention should satisfy the following requirements.

The total pore volume of the catalyst according to the invention as determined by nitrogen adsorption is preferably in the range of from 0.5 to 1.0 ml/g. If the total pore volume is below 0.5 ml/g, the catalyst pores are soon filled with the contaminant metals which precipitate on the catalyst as a result of the hydrodemetallisation reaction. As a result, catalyst life decreases to an unacceptably low level. On the other hand, if the total pore volume of the catalyst becomes too high, the catalyst bulk density decreases to a level which causes the loading density of the reactor to become insufficient.

The average pore diameter of the catalyst according to the invention as determined by nitrogen adsorption is preferably in the range of from 18 to 30 nm. In this specification, the average pore diameter is defined as the pore diameter at which 50% of the total pore volume is present in pores with a diameter below that pore diameter, and the other 50% of the total pore volume is present in pores with a diameter above that pore diameter.

If the average pore diameter is below 18 nm, the catalyst pores are so small that diffusion of the metals-containing asphaltene molecules in the catalyst, and in consequence, the hydrodemetallisation activity of the catalyst, is limited. The hydrodemetallisation activity of the catalyst can be increased by increasing its average pore diameter. However, the average pore diameter should not be above 30 nm, because an average pore diameter above this limit leads to a decrease of the hydrodesulphurisation activity to an unacceptably low level. The average pore diameter preferably is from 24 to 30 nm.

The catalyst according to the invention has at least 40% of the pore volume of pores with a diameter below 60 nm present in pores within a range of the average pore diameter ±5 nm. The pores present in the range of ±5 nm of the average pore diameter are considered to be the effective pores for the hydrodesulphurisation and hydrodemetallisation reactions to be effected by the catalyst according to the invention. Preferably, the percentage of the pore volume of pores present in the specified range is as high as possible.

A catalyst according to the invention satisfying the above-mentioned requirements with regard to its alumina R value, metals content, and pore size distribution will be suitable for effecting simultaneous hydrodesulphurisation and hydrodemetallisation of feedstocks containing sulphur and metals. However, it has been found that a catalyst with an even better performance in such a process is obtained when a certain percentage of the catalyst pore volume of pores with a diameter below 50 nm is present in pores with a diameter of from 35 to 50 nm. Rather than being active in the hydrodesulphurisation or hydrodemetallisation reactions effected by the catalyst according to the invention, the pores within this range are assumed to be effective as a diffusion path for the metal-containing asphaltenes and as storage space for contaminant metals to be deposited on the catalyst. However, the percentage of the pore volume of pores with a diameter in this range should not be too high because this will detract from the percentage of the pore volume of effective pores. Preferably, from 10 to 20% of the catalyst pore volume of pores with a diameter below 50 nm is present in pores with a diameter of from 35 to 50 nm.

The catalyst according to the invention generally has a surface area as determined by way of nitrogen adsorption in the range of from 100 to 220 $m^2/g$, preferably between 130 and 160 $m^2/g$. A surface area below 100 $m^2/g$ will lead to a low hydrodesulphurisation activity. On the other hand, a surface area above 220 $m^2/g$ cannot generally be combined with the requirement that the average pore diameter is above 18 nm.

The following description is a process for preparing the catalyst according to the invention. The catalyst according to the invention can be prepared as follows. In a first step, an alumina precursor such as alumina hydrate is prepared, for example by precipitation of aluminum sulphate with sodium aluminate. The alumina hydrate optionally is dried, for example by spray-drying, and then shaped to form particles, for example by extrusion. The thus obtained shaped particles are dried and subsequently subjected to a calcination step to form an alumina which contains gamma-alumina and delta- and/or theta-alumina in such a ratio that the alumina R value is within the specified range. The alumina hydrate can be converted into an alumina with an R value in the specified range by subjecting it to a calcination step at a temperature of at least 800° C. To obtain an alumina with an R value in the preferred range of from 0.20 to 0.25, the calcination step will generally be carried out at a temperature of from 850° to 950° C. The duration of the calcination step will depend upon the calcination temperature. When the calcination temperature is in the range of from 850° to 950° C., the desired R value can be achieved in three hours. The calcination step can optionally be carried out in the presence of steam. The person skilled in the art can determine the exact calcination time and temperature needed to obtain the desired R value by routine experimentation.

If additional components, such as silica, titania, or zirconia, are to be incorporated into the support, this can, for example, be effected by mixing them with the aluminum hydrate after precipitation, or in other ways known to a person skilled in the art.

The thus obtained support particles are then impregnated in one or more steps with a solution containing precursors of the metal component. For the Group VIB metals, ammonium heptamolybdate, ammonium dimolybdate, and ammonium tungstenate are examples of suitable precursors. For the Group VIII metals, nickel nitrate and cobalt nitrate are examples of suitable precursors. The impregnating solution may contain a phosphorus compound, such as phosphoric acid, to enhance the stability of the solution. Other compounds the use of which is known in the art, such as citric acid, may also be present.

After an optional drying step at a temperature in the range of from 25° to 200° C., the resulting material is calcined at a temperature in the range of from 350° to 750° C. to bring at least part, preferably all, of the metal component precursors to the oxide form.

It will be clear to a person skilled in the art that there is a wide range of variations on this method. Thus, it is possible to apply a plurality of impregnating steps, the impregnating solutions to be used containing one or more of the component precursors that are to be deposited, or a portion thereof. Instead of impregnating techniques, dipping methods, spraying methods, and the like can be used. In the case of multiple impregnation, dipping, and the like, drying and/or calcining may be carried out in between.

The catalyst particles may have many different shapes. The suitable shapes include cylinders, spheres, rings, and symmetric and asymmetric polylobes, for instance tri- or quadrulobes. The diameter usually amounts to from 1 to 10 mm, and the length also amounts to from 1 to 10 mm.

It is advisable to convert the catalyst, i.e., the metal components, into the sulphidic form prior to its use in the hydroprocessing of sulphur- and metals-containing feedstocks. This may be done in an otherwise conventional manner, e.g., by contacting the catalyst in the reactor at increasing temperature with hydrogen and a sulphur-containing feedstock, or with a mixture of hydrogen and hydrogen sulphide.

The catalyst according to the invention is suitable for effecting simultaneous hydrodesulphurisation and hydrodemetallisation of sulphur- and metals-containing feedstocks. Of course, the catalyst according to the invention may also be used in the treatment of feedstocks which contain only one of these contaminants, but in such a process the special dual removal properties of the catalyst according to the invention are less utilized. Examples of sulphur- and metals-containing feedstocks which can be subjected to simultaneous hydrodesulphurisation and hydrodemetallisation with the catalyst according to the invention are feeds containing atmospheric residues, vacuum residues, residues blended with gas oils, particularly vacuum gas oils, crudes, shale oils, and tar sand oils. Generally, the boiling range of such feedstocks is such that at least 70% by volume will boil above 450° C. The initial boiling point will generally be 300° C., frequently 350° C.

The sulphur content of the feed is generally above 0.1 wt. % and will frequently be more than 1 wt. %. The nitrogen content is generally above 500 ppm and will frequently be in the range of from 500 to 4000 ppm. The feedstock contains contaminant metals such as vanadium, nickel, and iron, generally in amounts above 3 ppm, frequently in the range of from 30 to 3500 ppm, and more frequently in the range of from 100 to 1000 ppm, calculated as metal.

Typical hydrotreatment process conditions include temperatures between 300° and 450° C., hydrogen pressures between 25 and 200 bar, $H_2$:oil ratios between 150 and 1500 Nl/l, and space velocities ($hr^{-1}$) between 0.1 and 5. The invention will be further illustrated with reference to the following specific examples. It is understood that these examples are given by way of illustration and are not meant to limit the disclosure or the claims to follow.

EXAMPLE 1

Preparation of Catalyst 1 according to the invention.
Support preparation 60 l of water were heated to a temperature of 89° C. in a stainless steel reaction vessel. 2 kg of an aqueous aluminum nitrate solution containing 5.4 wt. % of aluminum, calculated as $Al_2O_3$, were added thereto. Subsequently, 2.5 kg of an aqueous sodium aluminate solution containing 9.2 wt. % of aluminum, calculated as $Al_2O_3$, were added, and the mixture was stirred for 5 minutes. The pH of the mixture was 9.8. Then, 2 kg of the above-mentioned aluminum nitrate solution were added to the mixture, after which the mixture was again stirred for 5 minutes. The pH of the thus obtained mixture was 3.2. Two kg of the above-mentioned sodium aluminate solution were added to the mixture, which was again stirred for 5 minutes. The pH of the resulting mixture was 5.2. The alternate addition of aluminum nitrate and sodium aluminate was repeated nine times, after which an alumina hydrate gel was obtained. The gel was isolated by filtration and washed to remove salts.

5 kg of the thus obtained alumina hydrate filter cake were kneaded for one hour. Water was added to adjust the water content of the alumina hydrate to 65%. The water content was determined by placing a sample of alumina hydrate in a muffle furnace at 550° C. for three hours, and calculating the percentage of water using the following formula:

Water content (%)=

$$\frac{\text{Weight of wet sample} - \text{Weight of calcined sample}}{\text{Weight of wet sample}}$$

The alumina hydrate was shaped by extrusion through aquadrulobe die with a long axis of 1.3 mm and a short axis of 1.1 mm. The extrudates were dried in air for 12 hours at 120° C. These extrudates were indicated as Aluminum hydrate A.

A portion of the Aluminum hydrate A extrudates was heated to 800° C. in a period of three hours and held at that temperature for a further two hours, all in air. The thus obtained calcined support was indicated as Support A. One gram of Support A was ground in an agate mortar and subjected to X-ray diffraction analysis. This support was found to have an R value of 0.22.
Catalyst preparation An impregnation solution was prepared as follows. 130 grams of molybdenum trioxide (99.9 wt. % of $MoO_3$) and 116 grams of nickel nitrate (28.5 wt. % of Nio) were dispersed in 300 ml of water with intensive stirring. To the dispersion aqueous ammonia was added, with stirring, until the metal components were completely dissolved.

One kg of Support A was impregnated with an amount of impregnating solution which was sufficient to fill the carrier pore volume (incipient wetness procedure). The resultant impregnated support was dried in air at 120° C. for 12 hours, subsequently heated to 540° C. in two hours, and kept at that temperature for a further two hours. The thus obtained Catalyst 1 contained 6.9 wt. % of Mo and 2.0 wt. % of Ni, calculated as metal. The physical properties of the catalyst are given in Table 1.

EXAMPLE 2

Preparation of Catalyst 2 according to the invention.

A portion of the Aluminum hydrate A extrudates prepared in Example 1 was heated to 900° C. in a period of three hours and held at that temperature for a further two hours, all in air. X-ray diffraction analysis on a ground sample showed that the thus obtained calcined support had an R value of 0.30.

A catalyst was prepared on the basis of the thus obtained support in a manner analogous to the process described in Example 1. The thus obtained Catalyst 2 contained 2.8 wt. % of Mo and 0.8 wt. % of Ni, calculated as metal. The physical properties of the catalyst are given in Table 1.

EXAMPLE 3

Preparation of Catalyst 3 according to the invention.

An alumina hydrate filter cake was prepared in the same manner as described in Example 1. The water content of the cake was adjusted to 69% without kneading. The mixture was extruded, and the extrudates were dried and calcined in the same manner as described in Example 1.

A catalyst was prepared on the basis of the thus obtained support in a manner analogous to the process described in Example 1. The thus obtained Catalyst 3 contained 6.9 wt. % of Mo and 2.0 wt. % of Ni, calculated as metal. The physical properties of the catalyst are given in Table 1.

This catalyst differs from Catalyst 1 in that the percentage of the pore volume of pores with a diameter below 50 nm which is present in pores with a diameter in the range of from 35 to 50 nm is above the preferred range of from 10 to 20%.

EXAMPLE 4

Preparation of Catalyst 4 according to the invention.

An alumina hydrate filter cake was prepared in the same manner as described in Example 1. To 5 kg of said cake 2 ml of a 10 wt. % nitric acid solution were added. The mixture was extruded, and the extrudates were dried and calcined in the same manner as described in Example 1.

A catalyst was prepared on the basis of the thus obtained support in a manner analogous to the process described in Example 1. The thus obtained Catalyst 4 contained 6.9 wt. % of Mo and 2.0 wt. % of Ni, calculated as metal. The physical properties of the catalyst are given in Table 1.

This catalyst differs from Catalyst 1 in that the percentage of the pore volume of pores with a diameter below 50 nm which is present in pores with a diameter in the range of from 35 to 50 nm is below the preferred range of from 10 to 20%.

COMPARATIVE EXAMPLE 5

Preparation of Comparative Catalyst 5.

A portion of the Aluminum hydrate A extrudates prepared in Example 1 was heated to 900° in a period of three hours and held at that temperature for a further seven hours, all in air. X-ray diffraction analysis on a ground sample showed that the thus obtained calcined support had an R value of 0.49.

A catalyst was prepared on the basis of the thus obtained support in a manner analogous to the process described in Example 1. The thus obtained Comparative Catalyst 5 contained 6.9 wt. % of Mo and 2.0 wt. % of Ni, calculated as metal. The physical properties of the catalyst are given in Table 1.

COMPARATIVE EXAMPLE 6

Preparation of Comparative Catalyst 6.

A portion of the Aluminum hydrate A extrudates prepared in Example 1 was heated to 700° C. in a period of three hours and held at that temperature for a further three hours, all in air. X-ray diffraction analysis on a ground sample showed that the thus obtained calcined support had an R value of 0.02.

A catalyst was prepared on the basis of the thus obtained support in a manner analogous to the process described in Example 1. The thus obtained Comparative Catalyst 6 contained 6.9 wt. % of Mo and 2.0 wt. % of Ni, calculated as metal. The physical properties of the catalyst are given in Table 1.

COMPARATIVE EXAMPLE 7

Preparation of Comparative Catalysts 7, 8, 9, and 10.

Four catalysts with different metal contents were prepared on the basis of Support A described in Example 1 in a manner analogous to the catalyst preparation process described in Example 1. In this way, Comparative Catalyst 7, containing 1.5 wt. % of Mo and 2.0 wt. % of Ni, Comparative Catalyst 8, containing 10.0 wt. % of Mo and 2.0 wt. % of Ni, Comparative Catalyst 9, containing 6.9 wt. % of Mo and 0.3 wt. % of Ni, and Comparative Catalyst 10, containing 6.9 wt. % of Mo and 3.0 wt. % of Ni, were prepared. The physical properties of the catalysts are given in Table 1.

COMPARATIVE EXAMPLE 8

Preparation of Comparative Catalyst 11.

The Support preparation procedure described in Example 1 was repeated, except that the stirring time after the addition of aluminum nitrate was reduced to 1 minute. The stirring time after the addition of the sodium aluminate solution was maintained at five minutes. All other support preparation process steps, including the shaping and heating step, were carried out in exactly the same way as in Example 1.

A catalyst was prepared on the basis of the thus obtained support in a manner analogous to the process described in Example 1. The thus obtained Comparative Catalyst 11 contained 6.9 wt. % of Mo and 2.0 wt. % of Ni, calculated as metal. The physical properties of the catalyst are given in Table 1.

COMPARATIVE EXAMPLE 9

Preparation of Comparative Catalyst 12.

An alumina hydrate filter cake was prepared in the same manner as described in Example 1. 5 ml of a 10 wt. % nitric acid solution were added to 5 kg of said filter cake. The mixture was kneaded and extruded to form extrudates in the same manner as described in Example 1. The extrudates were subsequently dried and calcined in the same manner as described in Example 1.

A catalyst was prepared on the basis of the thus obtained support in a manner analogous to the process described in Example 1. The thus obtained Comparative Catalyst 12 contained 6.9 wt. % of Mo and 2.0 wt. % of Ni, calculated as metal. The physical properties of the catalyst are given in Table 1.

TABLE 1

| Cat. | R | Mo (wt. %) | Ni (wt. %) | APD (nm) | % PV in APD ± 5 nm | % PV < 50 nm in pores > 35 nm | PV (ml/g) | SA (m2/g) | HDS/HDM after 3 weeks | | |
|---|---|---|---|---|---|---|---|---|---|---|---|
| | | | | | | | | | HDS conv. % | HDM conv. % | H index |
| 1 | 0.22 | 6.9 | 2.0 | 26.6 | 45 | 13 | 0.75 | 147 | 58 | 89 | 0.60 |
| 2 | 0.30 | 2.8 | 0.8 | 26.6 | 46 | 13 | 0.72 | 144 | 42 | 81 | 0.84 |
| 3 | 0.22 | 6.9 | 2.0 | 27.2 | 45 | 32 | 0.68 | 130 | 50 | 75 | 0.62 |
| 4 | 0.22 | 6.9 | 2.0 | 24.0 | 46 | 7 | 0.68 | 147 | 57 | 70 | 0.50 |

TABLE 1-continued

| Cat. | R | Mo (wt. %) | Ni (wt. %) | APD (nm) | % PV in APD ± 5 nm | % PV < 50 nm in pores > 35 nm | PV (ml/g) | SA (m2/g) | HDS/HDM after 3 weeks | | |
|---|---|---|---|---|---|---|---|---|---|---|---|
| | | | | | | | | | HDS conv. % | HDM conv. % | H index |
| C.5 | 0.49 | 6.9 | 2.0 | 30.9 | 45 | 13 | 0.72 | 121 | 38 | 79 | 0.72 |
| C.6 | 0.02 | 6.9 | 2.0 | 20.0 | 45 | 14 | 0.74 | 148 | 60 | 61 | 0.42 |
| C.7 | 0.22 | 1.5 | 2.0 | 26.4 | 55 | 13 | 0.76 | 150 | 35 | 69 | 0.90 |
| C.8 | 0.22 | 10 | 2.0 | 25.0 | 46 | 13 | 0.71 | 148 | 61 | 59 | 0.38 |
| C.9 | 0.22 | 6.9 | 0.3 | 25.5 | 49 | 13 | 0.72 | 147 | 38 | 72 | 0.52 |
| C.10 | 0.22 | 6.9 | 3.0 | 25.0 | 49 | 13 | 0.72 | 150 | 60 | 68 | 0.40 |
| C.11 | 0.22 | 6.9 | 2.0 | 35.0 | 70 | 42 | 0.70 | 104 | 38 | 80 | 0.82 |
| C.12 | 0.22 | 6.9 | 2.0 | 16.0 | 48 | <1 | 0.68 | 221 | 62 | 50 | 0.20 |

EXAMPLE 10

Catalyst testing

Each of Catalysts 1, 2, 3, and 4 and Comparative Catalysts 5 through 12 was tested as follows: A sample of 50 ml of the catalyst to be tested was introduced into a reaction column with an inner diameter of 20 mm and a length of 1300 mm. A feedstock with the properties given in Table 2 was passed through the reaction column under the conditions specified in Table 3.

TABLE 2

Feedstock properties

| | |
|---|---|
| Density (15/4° C.) | 0.988 |
| Viscosity (50° C.) | 1.102 10−6 m2/s |
| Residual Carbon | 18.1 wt. % |
| Asphaltene Amount | 7.5 wt. % |
| Sulphur (as S) | 4.14 wt. % |
| Vanadium and Nickel | 44 + 17 ppm |

TABLE 3

Test conditions

| | |
|---|---|
| Reaction temperature | 390° C. |
| Hydrogen pressure | 132 bar |
| LHSV | 1.0 h−1 |
| Hydrogen:feed ratio | 800 Nl/l |

Density is determined using a II type float meter. Viscosity is determined with a "Viscosimeter with water bath VB-2" manufactured by Shibata Co., Ltd. Residual carbon is determined according to ASTM-D 4530-93 using a "Microcarbon Residue Tester" manufactured by Alcor Co., Ltd. The asphaltene content is determined by measuring the amount of feed which is insoluble in n-hexane. The sulphur content of feedstock and product was determined by way of X-ray fluorescence using a "Sulphur-in-Oil-Analyzer" available from Horiba Co., Ltd. The amounts of Ni and V of feedstock and product are determined by way of X-ray fluorescence using a "MESA-710" available from Horiba Co., Ltd.

After three weeks, the HDS and HDM conversions of each catalyst sample were determined. The results for each catalyst are given in Table 1.

The HDS and HDM conversion after three weeks in Table 1 are defined as follows.

$$HDS\ conv.\ \% = \frac{Sulphur\ in\ feed\ (wt.\ \%) - Sulphur\ in\ product\ (wt.\ \%)}{Sulphur\ in\ feed\ (wt.)}$$

$$HDM\ conv.\ \% = \frac{Ni + V\ in\ feed\ (ppm) - Ni + V\ in\ product\ (ppm)}{Ni + V\ in\ feed\ (ppm)}$$

After three weeks, the tested catalyst was removed from the reactor vessel and washed with toluene to remove adhering feedstock. The catalyst was dried at 50° C. for one day under nitrogen flow. The vanadium concentration over the cross-section of the catalyst particle was analyzed using an electron probe microanalyzer (EPMA).

It was found that all catalysts showed a concave vanadium profile, with a higher concentration on the outside of the catalyst particle and a lower concentration in the particle core, but that the difference between the vanadium concentration on the outside and on the inside of the catalyst particle varied for each catalyst. This can be seen from the H index, which is defined as the ratio between the vanadium concentration at the center of the catalyst particle and the vanadium concentration at the catalyst particle rim. An H index close to 1 implies that the vanadium is distributed uniformly through the catalyst particle, and in consequence, pore plugging by vanadium will take place very slowly. On the other hand, when the H index is low, the vanadium concentration on the outside of the catalyst particles is high, and pore plugging by vanadium takes place soon, resulting in a catalyst with a shorter life.

From Table 1 it can be seen that Catalysts 1 and 2 according to the invention show both a good hydrodesulphurisation and a good hydrodemetallisation activity after three weeks of use. All comparative catalysts show either a lower hydrodesulphurisation activity or a lower hydrodemetallisation activity. Catalysts 3 and 4, which are according to the invention but are not within the preferred embodiment, where from 10 to 20% of the pore volume of pores with a diameter below 50 nm is present in pores with a diameter of from 35 to 50 nm, also show better results than the comparative catalysts, but poorer results than Catalysts 1 and 2, which are within the preferred embodiment.

While the invention has been described with preferred embodiments, it is to be understood that variations and modifications are to be considered within the purview and the scope of the claims appended hereto.

What is claimed is:

1. A catalyst composition comprising:
   a) a support, at least 90 wt. % of which comprises alumina, which alumina has an R value of from 0.08 to 0.30, the R value being defined as the ratio between the integrated intensity of the X-ray diffraction peak at 2 θ=32° and the integrated intensity of the X-ray diffraction peak at 2 θ=46°;
   b) from 2 to 8 wt. % of a Group VIB metal component, calculated as metal;

c) from 0.5 to 2.5 wt. % of a Group VIII metal component, calculated as metal; and d) a pore size distribution as determined by nitrogen adsorption satisfying the following requirements:
 (i) a total pore volume of from 0.5 to 1.0 ml/g,
 (ii) an average pore diameter of from 18 to 30 nm, and
 (iii) of the pore volume of pores with a diameter below 60 nm at least 40% is present in pores within a range of the average pore diameter ±5 nm.

2. The catalyst composition according to claim 1, wherein the pore size distribution satisfies the additional requirement
 (iv) that from 10 to 20% of the pore volume of pores with a diameter below 50 nm is present in pores with a diameter of from 35 to 50 nm.

3. The catalyst composition according to claim 1, wherein the Group VIB metal component is molybdenum and the Group VIII metal component is nickel.

4. A process for the simultaneous hydrodesulphurisation and hydrodemetallisation of a feedstock containing metals and sulphur, wherein the feedstock is contacted at elevated temperature and pressure with a catalyst composition according to claim 1.

5. A process for preparing the catalyst composition of claim 1, comprising preparing an alumina precursor, forming support particles comprised of the alumina precursor, subjecting the support particles to a calcination step which is carried out in such a manner that after the calcination step the alumina has the R value of from 0.08 to 0.30, bringing the calcined support particles into contact with precursors of the Group VIB and Group VIII metal components to be incorporated into the catalyst composition to form a metals-containing support, and drying and calcining the metals-containing support particles to convert at least part of the metal component precursors into their oxide form.

6. The process for preparing a catalyst composition according to claim 5, wherein the calcination step is carried out at a temperature of from 850° C. to 950° C. for about three hours.

* * * * *

UNITED STATES PATENT AND TRADEMARK OFFICE
CERTIFICATE OF CORRECTION

PATENT NO. : 5,888,380
DATED : March 30, 1999
INVENTOR(S) : Katsuhisa FUJITA; Tetsuro KAMO; Masafumi SHIMOWAKE; and Yoshimasa INOUE It is certified that error appears in the above-identified patent and that said Letters Patent is hereby corrected as shown below:

On the title page, please add the following:

--Foreign Application Priority Data--

--September 19, 1994    JP    Japan    6-248288--

Signed and Sealed this

Twenty-eighth Day of September, 1999

Attest:

Attesting Officer

Q. TODD DICKINSON

Acting Commissioner of Patents and Trademarks